(No Model.)

R. P. SCOTT.
CORN SILKER.

No. 524,223.

Patented Aug. 7, 1894.

WITNESSES:
George Moncrieff
Edgar Smith

INVENTOR
Robert P. Scott

UNITED STATES PATENT OFFICE.

ROBERT P. SCOTT, OF CADIZ, OHIO.

CORN-SILKER.

SPECIFICATION forming part of Letters Patent No. 524,223, dated August 7, 1894.

Application filed February 12, 1894. Serial No. 499,960. (No model.)

*To all whom it may concern:*

Be it known that I, ROBERT P. SCOTT, of Cadiz, Harrison county, Ohio, have invented a new and useful Improvement in Corn-Silkers, of which the following is a specification.

The object of my invention is to produce a machine for automatically removing the silky fiber from green corn after the same has been cut from the cob. In this condition the green corn forms a thick, pasty mass and it is necessary to use gathering devices to which the silk shall adhere without having the corn adhere thereto at the same time, as otherwise a great deal of corn will be removed with the silk and, what is of more importance still, the gathering devices will clog up in a very short time and render the machine useless.

My invention consists of an open ended horizontal or inclined cylinder provided with preferably thin wedge shaped plates constituting gathering teeth distributed around the inner surface of the cylinder with the plane of the teeth at right angles to the axis of the cylinder, the cut green corn and intermixed silk being fed through one of the open ends into the bottom of the cylinder in the rotation of which the silk is gathered on the teeth which carry the silk to the upper side of the cylinder, the cut corn passing along the bottom to the other open end of the cylinder and being there discharged. I have also found that the teeth may be made of cylindrical pins instead of the wedge shaped plates. To remove the silk from the teeth, I provide a scraper located in the cylinder on the upper side of the same which periodically rubs along the teeth from their base or point of connection with the cylinder to their apex, the silk which as been gathered by the teeth adhering to the scraper from which it can be removed from time to time by hand. As there is but little silk in cut green corn, this scraper needs to be brought into action on a given row of teeth but once in every four or five revolutions of the cylinder.

Figure 1:
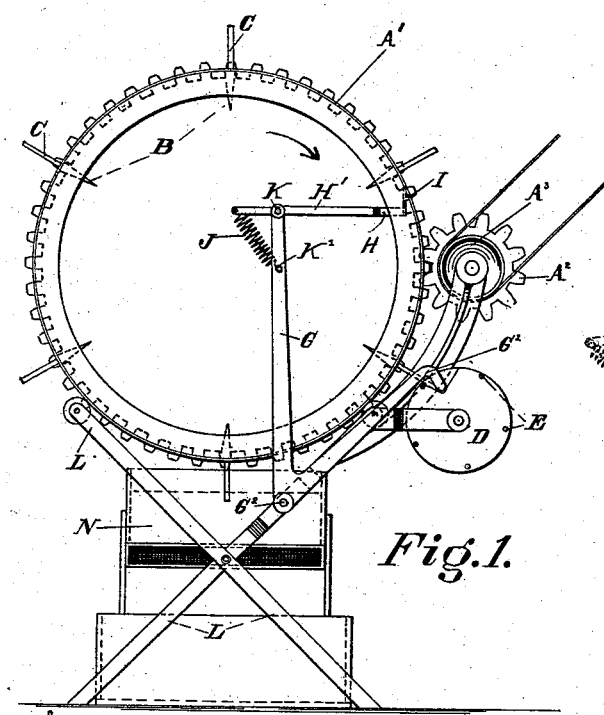
Figure 3:
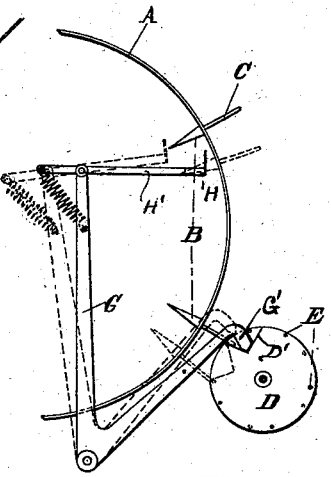
Figure 2:
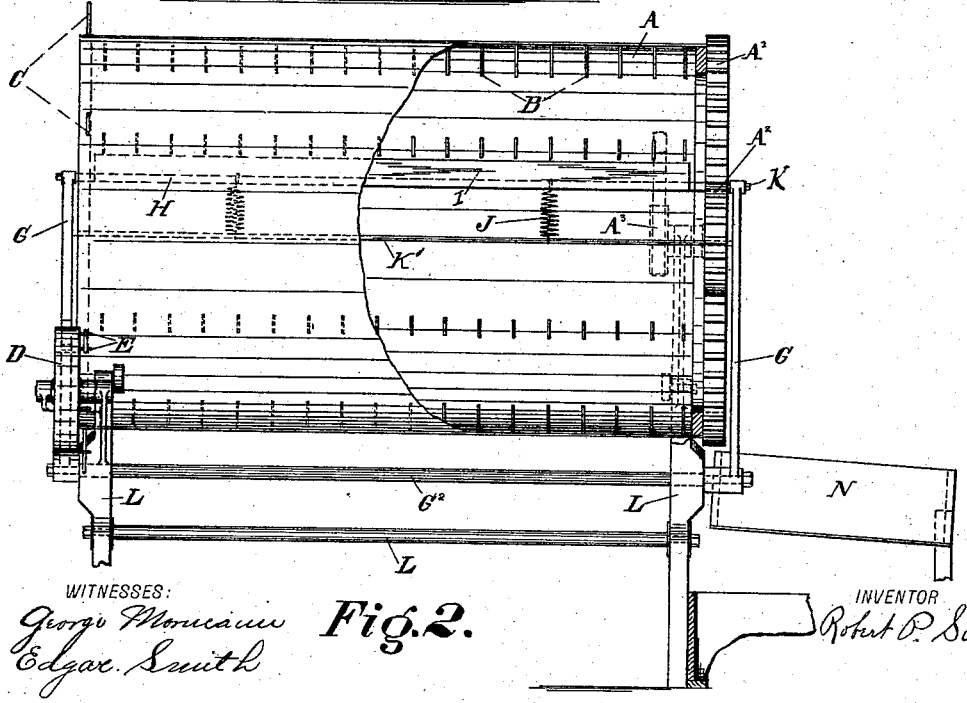

In the drawings, Figure 1 is an end elevation. Fig. 2 is a side view partly broken away, and Fig. 3 a detail view of a portion of the machine.

The cylinder A is provided on one end with an annular rack A' meshing with a pinion A" which receives its motion from a pulley A³.

On the inner surface of the cylinder, I provide a number of rows of gathering teeth B herein shown as made of flat plates of wedge shape. The cylinder is mounted to rotate on travelers pivoted to a trestle L. At opposite ends of the machine, bell crank levers G are mounted on an axis G" which is supported so as to rock in the trestle.

A bar H passing through the cylinder is secured at its opposite ends to the levers H' which are pivotally mounted on the upper ends of the bell cranks G. Two brace bars K, K' pass through the cylinder and connect the bell cranks to stiffen the structure. At the outer end of the bar H is fastened the scraper I preferably made of a strip of rubber. Springs J connect the levers H' and bar K' so as to give the scraper J an upward motion.

The bell cranks G are weighted to move toward the right in Fig. 1 by reason of the fact that one of the arms of the bell crank is nearly vertical and the other arm leans out toward the right and are rocked on their pivots G" by means of a pin wheel D having pins E which engage pins C on the outer surface of the cylinder. The point G' of one of the bell cranks normally rests on the outer circumference of the pin wheel and at the proper time drops in a groove D' therein thus rocking the bell cranks G and throwing the scraper I in the path of the gathering teeth B. The teeth of a row at this time passing the scraper in the direction of the arrow have any silk which may be attached to them scraped off onto the bar H, the springs J allowing a sufficient amount of yield to efficiently perform the work. The accumulated silk can be removed from the bar H every few hours by a hand tool shaped like a hoe.

It will be noticed that I have provided six pins C on the cylinder A and but five pins E on the pin wheel D. In consequence five revolutions of the cylinder will cause six revolutions of the pin wheel so that a different row of teeth B will be scraped each time, a row of teeth B being scraped by the scraper I on the average once in every five revolutions of the cylinder.

At the discharge end of the cylinder is provided a sieve N which in practice I give a shaking motion by power derived from the pinion A³ for removing any particles of husk and cob which may remain in the corn.

In operation the cut green corn and intermixed silk is fed into the cylinder at the left hand side of Fig. 2, and passes along the bottom of the same to be discharged onto the sieve N. The teeth B passing transversely through the corn gather the silk and carry it to the upper end of the cylinder, any corn which may be carried along dropping off before reaching a point over the bar H. Once in every five revolutions of the cylinder, for a given row of teeth B, the bell cranks G rock toward the right in Fig. 1, throwing the scraper I under the teeth and pulling off the silk onto the bar which may be removed therefrom as before indicated, so that each set of teeth is scraped once in every five revolutions of the cylinder.

What I claim is—

1. A cut green corn silking machine comprising the combination of a rotary cylinder provided with gathering teeth on its inner surface and automatic scraping devices for removing the silk from the teeth, substantially as described.

2. A cut green corn silking machine comprising the combination of an imperforate rotary cylinder provided with gathering teeth and automatic cleaning devices for removing the silk from the teeth, substantially as described.

3. A green corn silking machine comprising the combination of a rotary cylinder provided with gathering teeth on its inner surface, a yieldingly mounted scraper within the cylinder and periodically acting devices for throwing the scraper into the path of the teeth, substantially as described.

4. A green corn silking machine comprising the combination of a rotary cylinder provided with gathering teeth on its inner surface, a scraper yieldingly supported on levers at the opposite ends of the cylinder and rocking devices for the levers, substantially as described.

5. A green corn silking machine comprising the combination of a rotary cylinder provided with gathering teeth on its inner surface, a scraper yieldingly supported on levers at the opposite ends of the cylinder and a wheel having a groove for rocking one of the levers and thereby throwing the scraper into the path of the teeth, substantially as described.

6. A green corn silking machine comprising the combination of a rotary cylinder provided with gathering teeth on its inner surface, a scraper yieldingly supported on levers at the opposite ends of the cylinder, a grooved pin wheel for actuating one of the levers and throwing the scraper into the path of the teeth and pins actuated by the cylinder for engaging the pins on the pin wheel, substantially as described.

7. A green corn silking machine comprising the combination of a rotary cylinder provided with gathering teeth on its inner surface, a scraper yieldingly mounted on bell crank levers, a grooved pin wheel for actuating the levers and pins on the cylinder for engaging the pin wheel, substantially as described.

ROBERT P. SCOTT.

Witnesses:
   THOS. M. DOBBIN,
   C. L. BUCKLIN.